(12) United States Patent
Tahara et al.

(10) Patent No.: US 10,698,920 B2
(45) Date of Patent: Jun. 30, 2020

(54) TECHNIQUES FOR A LINEARIZABLE PRIMARY-SECONDARY DATABASE SYSTEM THAT REPLICATES DATABASE DATA WITH EVENTUAL CONSISTENCY

(71) Applicant: Dropbox, Inc., San Francisco, CA (US)

(72) Inventors: Daniel Tahara, San Francisco, CA (US); Mehant Baid, San Francisco, CA (US); Robert Escriva, San Francisco, CA (US); Mihnea Cezar Giurgea, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 331 days.

(21) Appl. No.: 15/852,271

(22) Filed: Dec. 22, 2017

(65) Prior Publication Data

US 2019/0197173 A1  Jun. 27, 2019

(51) Int. Cl.
| | | |
|---|---|---|
| *G06F 16/27* | (2019.01) | |
| *H04L 29/08* | (2006.01) | |
| *G06F 3/06* | (2006.01) | |
| *G06F 16/21* | (2019.01) | |
| *G06F 16/23* | (2019.01) | |

(52) U.S. Cl.
CPC .......... *G06F 16/27* (2019.01); *G06F 3/065* (2013.01); *G06F 16/21* (2019.01); *G06F 16/2365* (2019.01); *H04L 67/1095* (2013.01); *H04L 67/1097* (2013.01)

(58) Field of Classification Search
CPC ...... G06F 16/27; G06F 16/21; G06F 16/2365; G06F 3/065; H04L 67/1095; H04L 67/1097
USPC .......................................................... 707/610
See application file for complete search history.

(56) References Cited

U.S. PATENT DOCUMENTS

| | | | | |
|---|---|---|---|---|
| 7,672,979 B1* | 3/2010 | Appellof | ............. | G06F 11/1435 707/649 |
| 8,689,043 B1* | 4/2014 | Bezbaruah | .......... | G06F 11/2058 711/162 |
| 2004/0039959 A1* | 2/2004 | LeCrone | ............. | G06F 11/2094 714/6.3 |
| 2005/0273565 A1* | 12/2005 | Hirakawa | ........... | G06F 11/2058 711/162 |
| 2007/0136389 A1* | 6/2007 | Bergant | .................. | H04L 69/40 |
| 2008/0077686 A1* | 3/2008 | Subhraveti | .......... | G06F 11/2097 709/224 |

(Continued)

*Primary Examiner* — Evan Aspinwall
(74) *Attorney, Agent, or Firm* — Hickman Palermo Becker Bingham LLP; Adam C. Stone

(57) ABSTRACT

Techniques are provided for a linearizable primary-secondary database system that replicates database data with eventual consistency. The techniques include obtaining a logical clock value of a logical clock that orders transactions committed at a primary database system that includes a primary database. The logical clock value is obtained after a write transaction is committed at the primary database system and while processing a read request. The logical clock value is used to determine whether a secondary database is in a consistent replication state corresponding to the logical clock value with respect to the primary database. The read request is maintained in a linger state while the secondary database is not yet in the consistent replication state. The read request exits the linger state and is allowed to be processed against the secondary database after the secondary database has reached the consistent replication state.

20 Claims, 9 Drawing Sheets

(56) References Cited

U.S. PATENT DOCUMENTS

2012/0166390 A1* 6/2012 Merriman ........... G06F 11/1458
707/613
2017/0286516 A1* 10/2017 Horowitz ............ G06F 11/1458
2018/0046643 A1* 2/2018 Brodt .................... G06F 16/178

* cited by examiner

TECHNIQUES FOR A LINEARIZABLE PRIMARY-SECONDARY DATABASE SYSTEM THAT REPLICATES DATABASE DATA WITH EVENTUAL CONSISTENCY

TECHNICAL FIELD

The technology described herein relates to computer-implemented techniques for providing a linearizable primary-secondary database system even though replication of data from the primary database to the secondary database is eventually consistent.

BACKGROUND

Online services, including large-scale online services accessible on the Internet, use database systems to durably store data. These database systems are often implemented on commodity computer systems that tend to fail eventually. As such, database replication is often used to increase the availability of the data. Database replication creates a secondary copy of primary data on another computer systems such that if the computer systems storing the primary copy fails, the secondary copy is still available.

A benefit of database replication is that it increases data availability. A drawback is that it requires more computer systems. Further, the computer system storing the secondary copy may be underutilized. For example, all write and reads requests for the data may be served by the primary database system.

It is possible to load balance read requests for the data between the primary database system and the secondary database system. However, the database replication may be eventually consistent. As such, a data value that is stored in the primary database may not exist in the secondary database until sometime later. Thus, even if all write operations are sent to the primary database system, a subsequent read operation that is sent to the secondary database system may read a stale data value from the secondary database. In other words, because of the eventual consistency of the database replication, the primary and secondary database systems together may not provide linearizable read and write operations to clients.

The techniques herein address these and other issues.

SUMMARY

The appended claims serve as a useful summary of some embodiments of the techniques for a linearizable primary-secondary database system that replicates data with eventually consistency.

DRAWINGS

The techniques will be better and more completely understood by referring to the following detailed description of example non-limiting illustrative embodiments in conjunction with the drawing of which:

DETAILED DESCRIPTION

Figure 1:
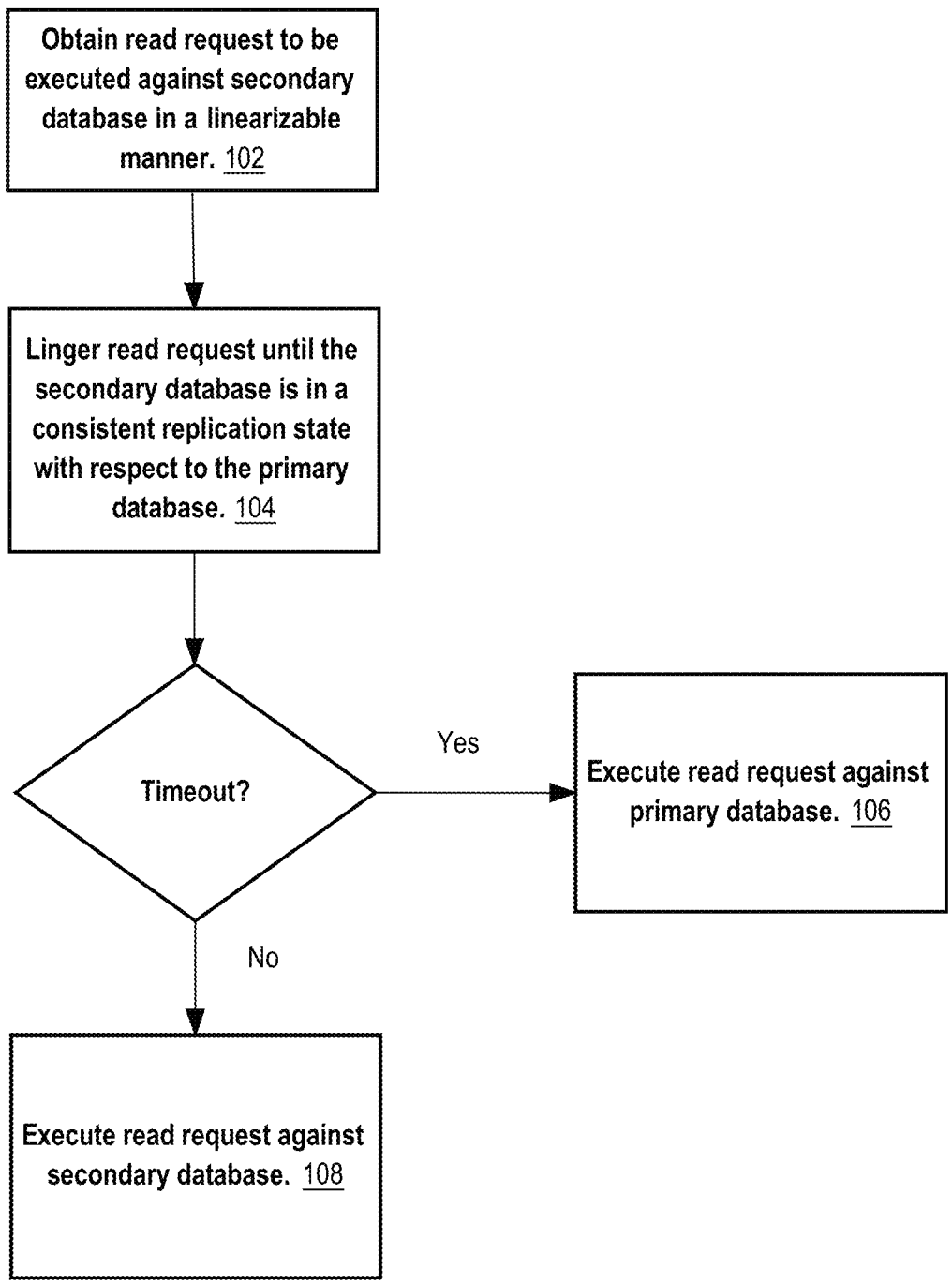
FIG. 1 is a flowchart of an overall process for providing a linearizable primary-secondary database system built on an existing primary-secondary database system that replicates database data with eventual consistency, according to some embodiments.

The techniques herein address issues with primary-secondary database systems that use non-consensus, active-passive, or eventually consistent database replication to replicate data from the primary database system to the secondary database system. In general, in such systems, read requests from clients of the primary-secondary database system may not be served in a linearizable manner if some of those read requests are served by the secondary database system. This is because the secondary database may not be up-to-date with respect to the latest (recent) transactions that have been committed to the primary database at the time the read request is being processed by the secondary database system. For example, a client that submits a write request to the primary database system to update data in a particular database field of the primary database, and then submits a read request to the secondary database system thereafter, may receive an older version of data in the particular database field from the secondary database if the update has not yet been replicated from the primary database to the secondary database by the time the read request is processed by the secondary database system against the secondary database. This may be undesirable from the perspective of the client because in this case the primary-secondary database system does not provide linearizable read and write operation. This also may be undesirable from the respective of the primary-secondary database system because to provide linearizable read and write operation to clients, all read and write requests must be served by the primary database system. At the same time, the secondary database system and its computing resources are underutilized with respect to those requests.

A large-scale online service may utilize many primary-secondary database systems, such as arranged in a distributed computing environment across multiple data centers. Having the secondary database system of each pair operate idly with respect to read requests is expensive for the operator of the online service both from a monetary cost perspective and from a performance perspective. As for monetary cost, the operator must still pay for power and data center resources (e.g., rack space and networking) when the secondary database systems are not processing read requests. From a performance perspective, the operator would prefer to be able direct some read requests that the primary database system would otherwise handle to the secondary database system while providing linearizable read and write operation to clients. This ability may be especially desired for large read requests (e.g., a read request that reads over a threshold amount of data from the database) and for lower priority read requests. Such requests could adversely impact the performance of the primary database system in serving higher priority read requests (e.g., read operations that occur in the context of serving an end-user request of the online service) if those large and/or lower priority read requests were also processed by the primary database system and not the secondary database system.

Techniques disclosed herein address these and other issues by providing primary-secondary database systems that support linearizable read and write operations for clients. According to the techniques, write requests are served by the primary database system and read requests can be served by either the primary database system or the secondary database system even though database replication from the primary database to the secondary database is eventually consistent. In some embodiments, the techniques are transparent to the clients such that the client is not required to select whether a read request is served by the primary database system or the secondary database system.

In some embodiments, the techniques encompass three different approaches. All three approaches provide linearizable read and write operation to clients. That is, a client that submits a write request that is successfully processed by the primary database system can read the data written by that write with a subsequent read request even if the read request is processed by the secondary database system. In doing so, all three approaches ensure that the subsequent read request is processed against the secondary database when the secondary database is at the same or a later logical point in time than the primary database if and when the read request had been processed by the primary database system instead of the secondary database system. Further, all three approaches are transparent to the clients submitting read and write requests such that a client need not select whether a given read request is served by the primary database system or the secondary database system. Thus, all three approaches can be used with various different load balancing strategies for read requests in a way that is transparent to the clients. It should be noted, however, that while the approaches do not require the client to select whether a read request that it submits is served by the primary database system or the secondary database system, there is no prohibition against such selection, either directly or indirectly (e.g., by a hint provided by the client along with the read request).

In one approach, a read request from a client that is to be served by the secondary database system is preceded with a token write to the primary database system. The token write may involve incrementing a logical clock in the primary database, for example. Then, the read request is submitted to the secondary database system after observing that the token write has been replicated from the primary database to the secondary database. By doing so, it is ensured that the secondary database is up-to-date with respect to the primary database at least to the logical point in time when the token write is committed to the primary database, which is after the logical point in time the read request is submitted by the client. This token write approach is useful if read requests are large and relatively expensive to process compared to write requests. In that case, the token write represents a relatively small amount of computing resources of the primary-secondary database system consumed compared to the computing resourced consumed by the read request.

The token write approach may not be as suitable for a more balanced workload where most read requests are not large and are not relatively expensive compared to write requests. Another problem with the token write approach is maintaining the logical clock. In particular, the logical clock must be updated in the primary database in a strictly increasing manner which requires coordination and the associated overhead among concurrent write requests to update the logical clock. Further, there may be high read contention at the secondary database system among many concurrent read requests for the current value of the logical clock in the secondary database.

The other two approaches eschew maintenance of a logical clock that is dedicated to providing linearizable read and write operation and instead rely on existing logical clocks that are also used for other purposes. One type of logical clock that may exist is a sequentially increasing version identifier for a data object for versioning updates to the data object. Each time the data object is updated (modified) in the primary database, the version identifier for the data object may also be updated (incremented) in the primary database. The updated version identifier as well as the update to the data object itself may then eventually be replicated to the secondary database. In this case, the versioned data object logical clock may be used to provide linearizable read and write operation with respect to the data object. In particular, a read request for the data object that is to be served by the secondary database system can be processed by obtaining the current version identifier for the data object from the primary database and then waiting until the data object is at least at that version in the secondary database before the read request is submitted to the secondary database system for processing against the secondary database. By doing so, the read request is processed against the secondary database in a state that is consistent with respect to the primary database at least with respect to the determined current version of the data object. This data object version approach has the benefit that if the data object has not been updated in the primary database for a relatively long time, then the approach may not need to wait long (or at all) for the replication process to bring the secondary database to a state that is consistent with the primary database at least with respect to the determined current version of the data object. On the downside, reading the current version of the data object in the primary database may require non-volatile memory access to read the current version from the primary database, which typically consumes more computing resources used by the primary database system that volatile memory access would.

Another type of logical clock that may exist is a global transaction identifier (GTID). A GTID is a sequentially increasing unique identifier created and associated with each transition committed on the primary database system. A GTID may be unique not only to the primary database system and the primary database but also to the secondary database system and the secondary database. There may be a one-to-one mapping between all transactions committed by the primary database system and all GTIDs. In this case, processing a read request from a client that is to be processed by the secondary database system may involve obtaining the current GTID from the primary database system and waiting at least until the transaction corresponding to the current GTID is replicated from primary database to the secondary database before having the secondary database system process the read request against the secondary database. This approach has an advantage over using the versioned data object approach above in that the current GTID at the primary database system may be stored in volatile memory thereby potentially avoiding having to access non-volatile memory. However, the GTID approach has a disadvantage with respect to the versioned data object approach in that a read request may unnecessarily wait for updates to data objects that are not the subject of the read request to replicate from the primary database to the secondary database while waiting for the transaction for the current GTID to be replicated to the secondary database.

Process for Providing a Linearizable
Primary-Secondary Database System

These approaches will now be described with respect to FIG. 1 which is a flowchart of an overall process 100 for providing a linearizable primary-secondary database system even though replication of data from the primary database to the secondary database is eventually consistent, according to some embodiments. As an overview, process 100 of FIG. 1 begins by obtaining 102 a read request that is to be executed by the secondary database system against the secondary database in a linearizable manner. The read request lingers 104 while waiting for the secondary database to be a consistent replication state with respect to the primary database. If the linger 104 times out while waiting for the secondary database to be in the consistent replication state, then the read request is executed by the primary database system against the primary database. Otherwise, once the secondary database is in consistent replication state, then the read request is executed by the secondary database system against the secondary database.

Returning to the top of FIG. 1, process 100 obtains 102 a read request that is to be executed by the secondary database system against the secondary database. The read request may be obtained 102 from a client of the primary-secondary database system. For example, the client could be a computer system process and/or thread in an application tier of distributed computing environment 500 of FIG. 5.

Figure 6:
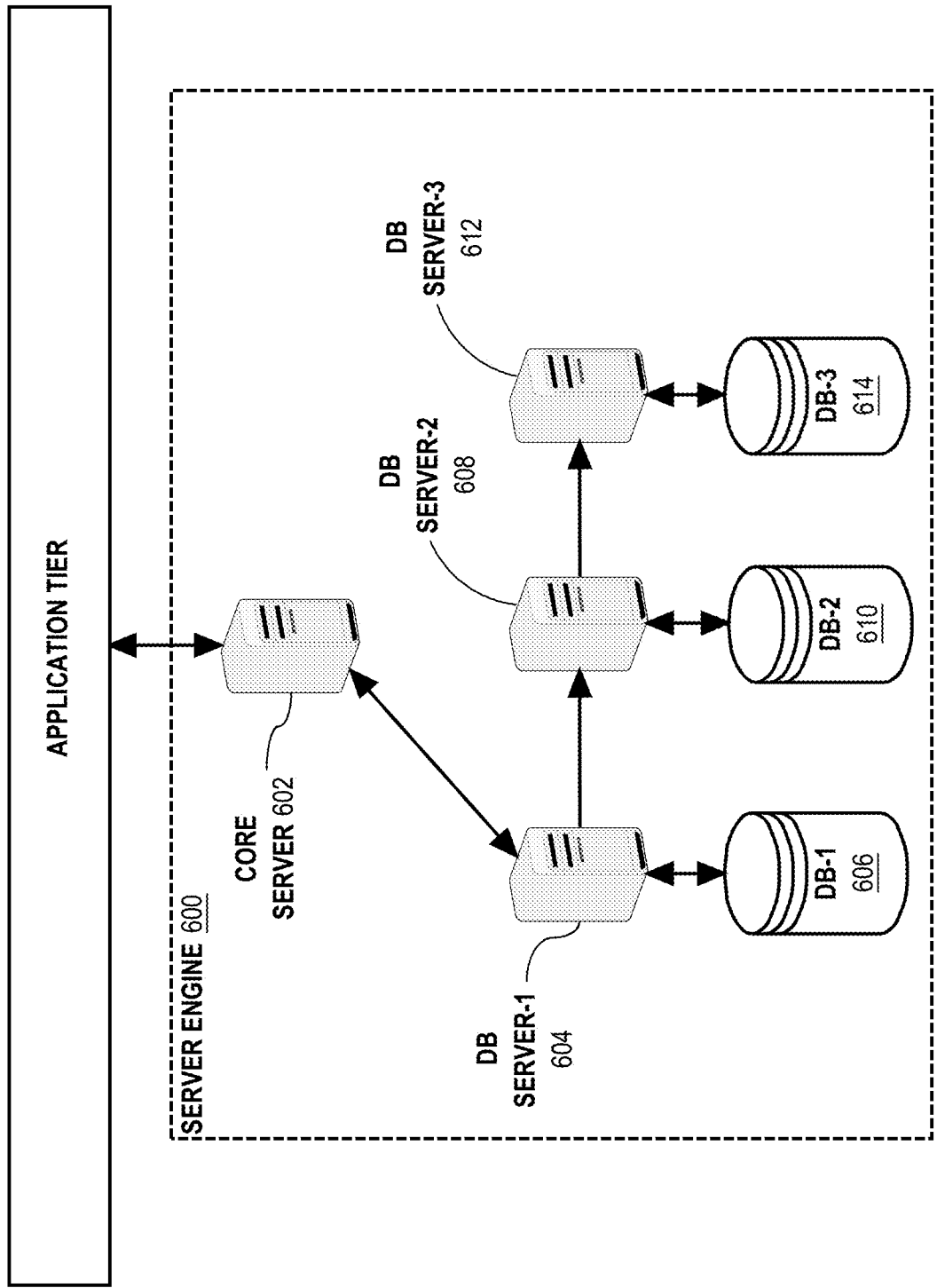
FIG. 6 depicts an example database server engine of the distributed computing environment of FIG. 5, according to some embodiments.
Figure 7:
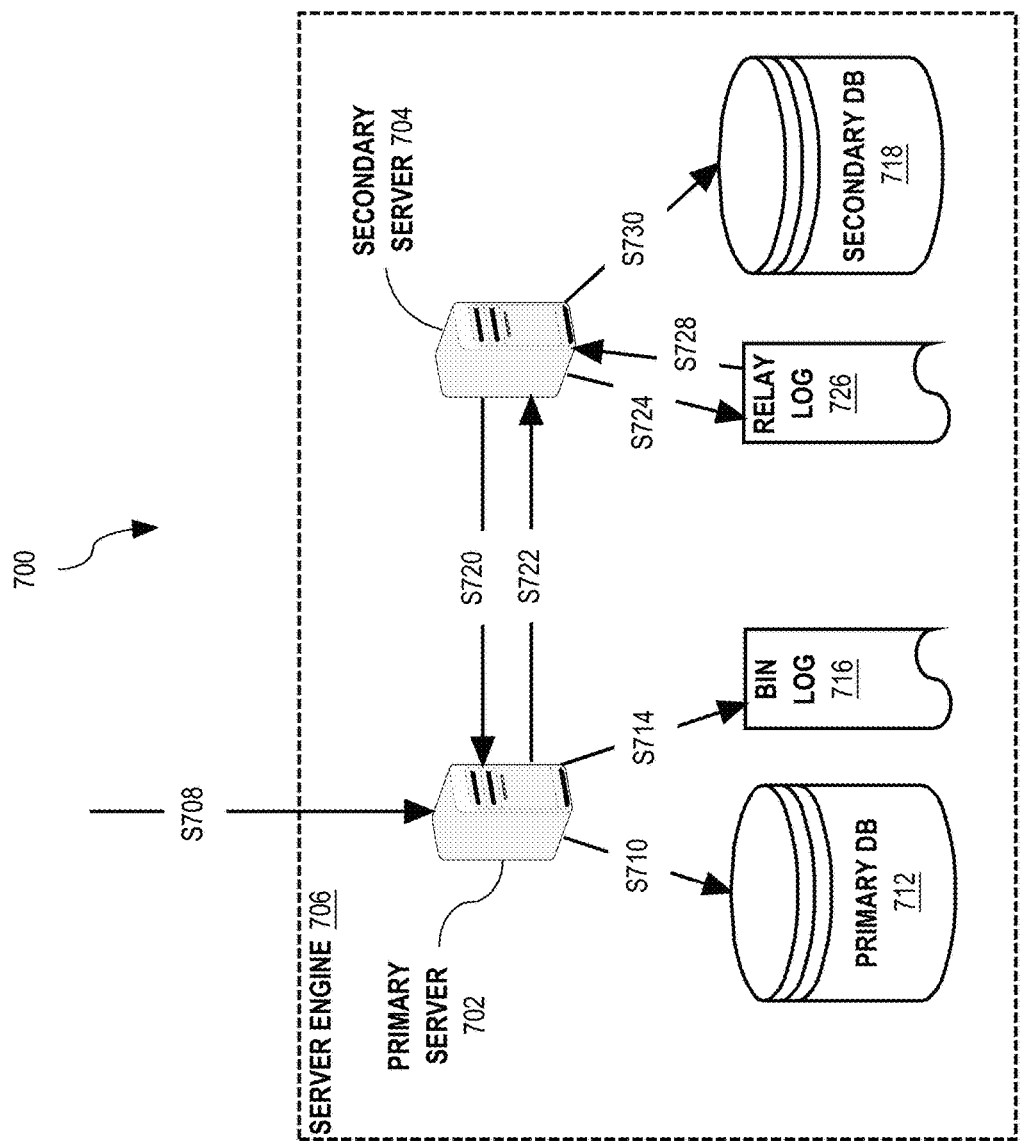
FIG. 7 depicts an example process for eventually consistent database replication with the example database server engine of FIG. 6, according to some embodiments.

The read request may be obtained 102 by a server engine 510 of the distributed computing environment 500 such as, for example, server engine 600 of FIG. 6 or server engine 706 of FIG. 7. If the server engine includes a core server such as core server 602 of server engine 600, then the core server may obtain 102 the read request. The core server may then route the read request onto the secondary database system such as, for example, secondary database server 704 of server engine 706. For example, the core server may obtain 102 the read request and determine that the read request is to be executed by the secondary database system against the second database (e.g., secondary database 718 of server engine 706). The core server may make this determination according to various criteria. For example, the core server may implement a load balancing or routing algorithm to route read requests from clients to either the primary database system (e.g., primary server 702 of engine 706) or the secondary database system (e.g., secondary server 704 of engine 706). The core server may route a read request based on a variety of different characteristics of the read request such as, for example, the priority of the read request and/or the size of the read request. For example, the core server may route high priority read requests that are being served in the context of end-user requests of an online service to the primary database system. The core server may then route other lower priority requests to the secondary database system. As another example, the core server may route large read requests (e.g., read requests that are expected read more than a threshold amount of data and/or more than a threshold number of data objects from the database) to the secondary database system so as to avoid overloading the computing resources of the primary database system which processes write requests from clients. The core server may also route read requests to either the primary database system or the secondary database system depending on the current or recent load detected on the primary database system. For example, the core server may initially route all read requests to the primary database system. Upon detecting that the load on the primary database system exceeds a threshold (e.g., CPU load, I/O load, request rate, etc.), the core server may then begin routing some or all read requests to the secondary database system until the load on the primary database system drops below a threshold. The foregoing provides just some examples of how the core server might route a read request to the secondary database system instead of the primary database server and process 100 is not limited to any particular routing or load balance technique.

The read request may be obtained 102 by the secondary database system. For example, if the server engine does not include a core server, then the secondary database system might obtain 102 the read request from the client. The core server may also route the read request to the secondary database system. In some embodiments, the core server performs the linger operation 104. In this case, the secondary database system might not obtain 102 the read request. Instead, the secondary database system might obtain one or more database commands (e.g., one or more SQL SELECT commands) reflecting the read request. The core server may include functionality for translating the read request into the one or more database commands (e.g., according to an object-to-relationship mapping) as well as functionality for performing the linger operation 104. In some embodiments, the secondary database system performs the linger operation 104. In these embodiments, the secondary database system may include the translating functionality as well as the linger functionality 104. In some embodiments, the read request is obtained 102 from the client in a data serialization format (e.g., JSON, XML, protobuf, YAML, BSON, MessagePack, etc.) that is suitable for encapsulating the read request when sent from the client over a data network as part of an application-layer networking protocol (e.g., TCP, HTTP, HTTPS, etc.) payload.

After the read request is obtained 102, either by the core server or the secondary database system, the read request is made to linger 104 until the secondary database is in a consistent replication state with respect to the primary database. In some embodiments, the linger operation 104 is not performed unless the read request specifies that linearizable operation is required for the read request. For example, the read request may contain a flag or other data value specified by the client that specifies whether linearizable operation for the read request is required.

In some embodiments, the linger operation 104 is performed for all read requests unless the read request specifies that linearizable operation is not required. For example, the read request may contain a flag or other data value specified by the client that specifies that linearizable operation is not required. If linearizable operation for the read request is not required, then the read request may be executed by secondary database system against the secondary database without needing to linger 104 the read request until the secondary database in the consistent replication state. In this case, the client may receive an out-of-data data value from the secondary database if a newer recently written data value has not yet replicated from the primary database.

The consistent replication state is at a logical point in time in the primary database that is after the client has submitted the read request to the system. Thus, the consistent replication state will reflect any successful writes to the primary database submitted by the client that were successfully committed to the primary database before the client submitted the read request. As such, by lingering 104 the read request until the secondary database is in the consistent replication state, linearizable read/write operation is provided to the client despite the read request being executed by the secondary database system against the secondary database and despite the database replication from primary database to the secondary database being eventually consistent.

Figure 2:
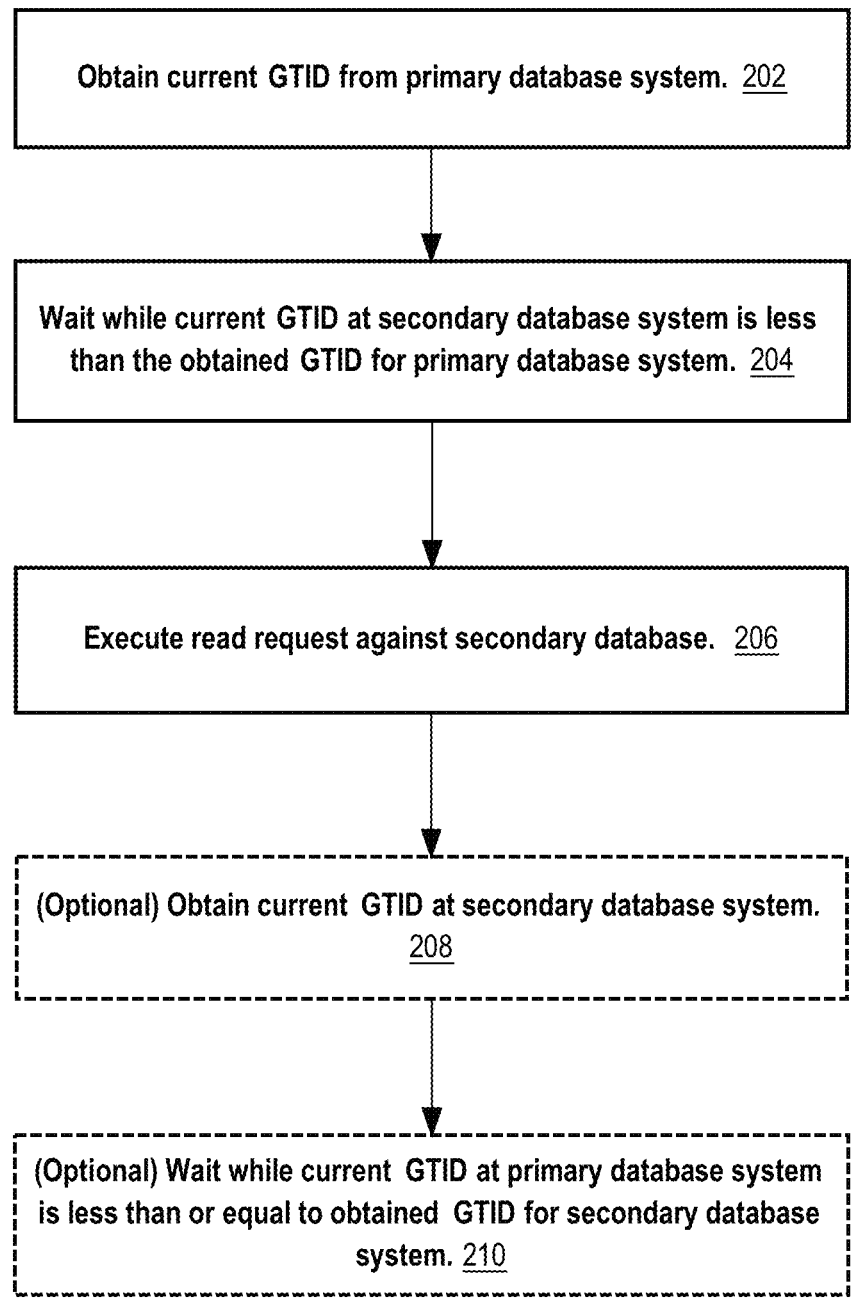
FIG. 2 is a flowchart of a global transaction identifier approach for lingering a read request, according to some embodiments.
Figure 3:
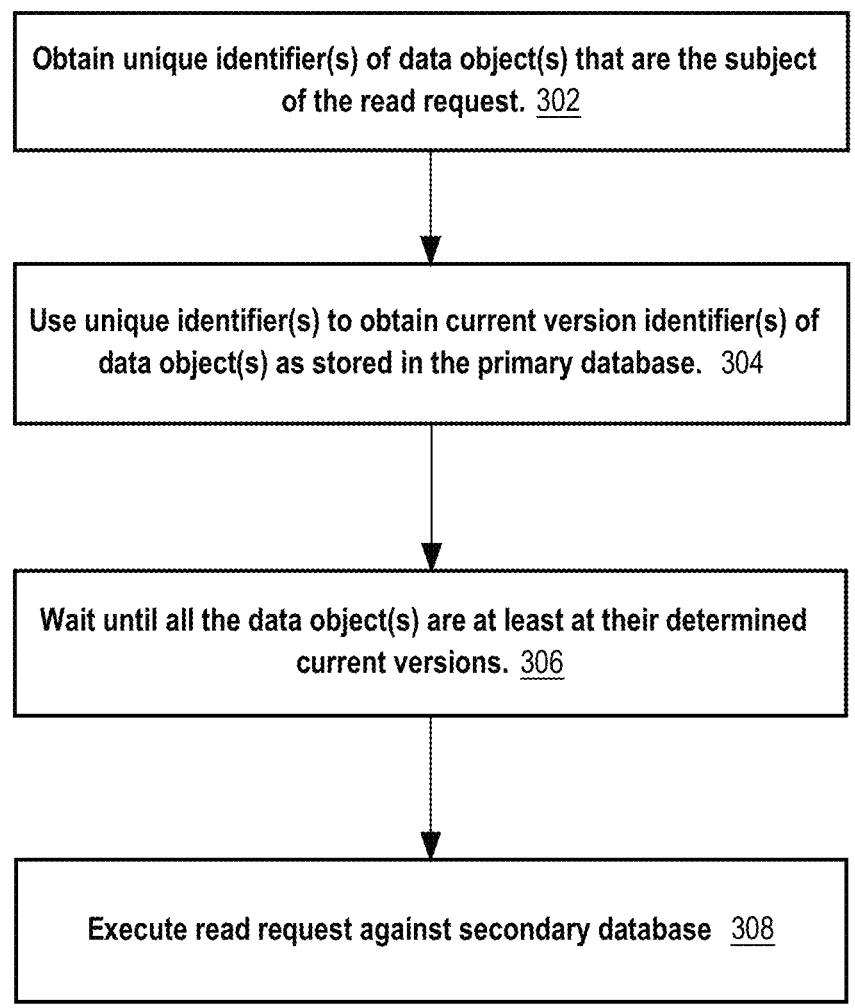
FIG. 3 is a flowchart of a versioned data object approach for lingering a read request, according to some embodiments.
Figure 4:
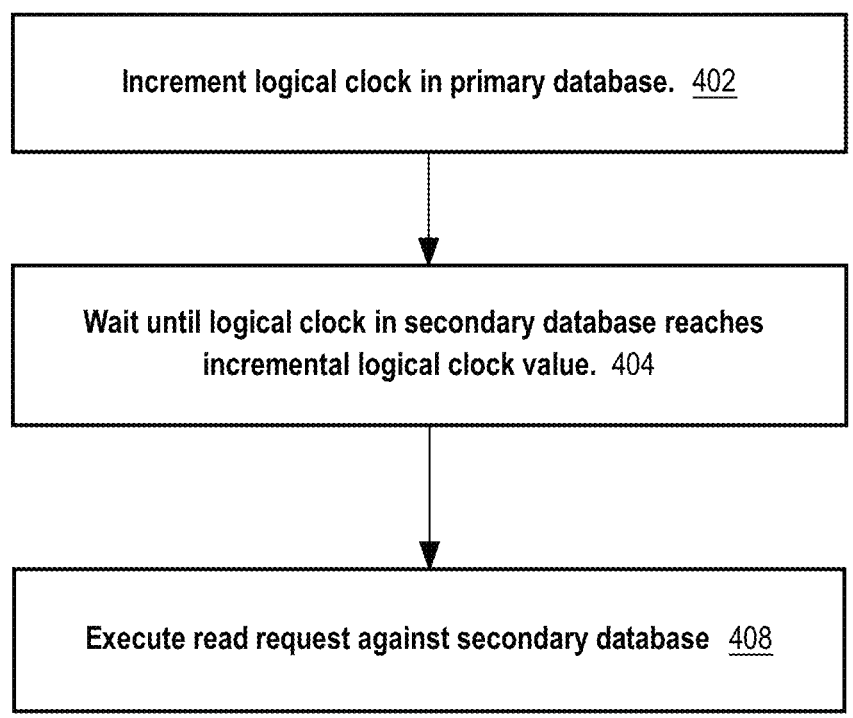
FIG. 4 is a flowchart of a dedicated logical clock approach for lingering a read request, according to some embodiments.

Three different approaches for lingering 104 the read request until the secondary database is in the consistent replication state with respect to the primary databases are described herein with respect to FIG. 2, FIG. 3, and FIG. 4. In particular, FIG. 2 depicts a global transaction identifier approach for lingering 104 the read request, FIG. 3 depicts a versioned data object approach, and FIG. 4 depicts a dedicated logical clock approach. Generally, however, lingering 104 the read request involves waiting (pausing) for the secondary database to be in a consistent replication state with respect to the primary database before the read request is executed by the secondary database system against the secondary database.

When lingering 104 the read request, a timer may be used to time how long the read request is being lingered. If the read request is lingering 104 too long (e.g., the linger time exceeds a predetermined threshold), then the linger operation 104 is timed out and the read request may be executed by the primary database system against the primary database. On the other hand, if it is detected that the secondary database has reached the consistent replication state before expiration of the predetermined linger timeout, then the read request may be executed by the secondary database system against the secondary database.

The linger timeout may vary according to the requirements of the particular implement at hand. For example, in one exemplary embodiment, the linger timeout is 50 milliseconds from when the linger operation 104 is initiated which is after the read request is obtained 102 and before the read request is executed 108 against the secondary database system or executed 106 against the primary database system. Further, the linger timeout may adjust up or down automatically over time according to a local replication lag metric or a geographical replication lag metric such as those described in related U.S. patent application Ser. No. 15/601,094, entitled "Replication Lag-Constrained Deletion of Data in a Large-Scale Distributed Data Storage System," filed May 22, 2017, the entire contents of which is hereby incorporated by reference. For example, the linger timeout may automatically increase up to a maximum linger timeout as the replication lag metric or the geographic replication lag metric indicates that replication lag from the primary database to the secondary database system is increasing. Similarly, the linger timeout may automatically decrease down to a minimum linger timeout as the replication lag metric or the geographic replication lag metric indicates that replication lag is decreasing. The local metric or the geographic metric may be used depending on whether the primary and secondary database systems are locally or geographically situated.

It should also be understood that the global transaction identifier (FIG. 2), versioned data object (FIG. 3), and dedicated logical clock (FIG. 4) approaches are not mutually exclusive of each other and may be used together in a particular implementation. For example, different of the approaches may be used for different read requests. For example, an approach may be selected for an obtained 102 read request depending the recent linger timeout rate which may be a function of a number of recently obtained 102 read requests that timed out in the linger operation 104 and thus were executed 106 against the primary database instead of the secondary database and a number of recently obtained 102 read requests that did not time out in the linger operation 104. A high time out rate may be indicative of serve replication lag. In this case, the versioned data object approach (FIG. 3) may be favored over the global transaction identifier approach (FIG. 2) because the versioned data object approach (FIG. 3) may not need to wait for data to be replicated if the data object or data objects that is/are the subject of the read request have not been modified recently. On the other hand, the global transaction identifier approach will need to wait for at least some data to be replicated if there is severe replication lag. In some embodiments, the global transaction identifier approach is used for read requests so long as no recent read request has timed out in the linger operation 104. Here, recent may be determined based on a window of time in the past or a last number of read requests obtained 102, for example. If a recent read request is timed out in the linger operation 104, then the versioned data object approach is used for some future read requests. Which approach to use may also be selected based on the local replication lag metric or the geographical replication lag metric discussed above. For example, the global transaction identifier approach may be used for read requests so long as a replication lag metric remains below a threshold, and the versioned data object approach used while the replication lag metric remains above a threshold.

Global Transaction Identifier Approach

FIG. 2 is a flowchart of a global transaction identifier approach 200 for lingering the read request as in the linger operation 104 of process 100 above, according to some embodiments.

Each of the primary database system and the secondary database system may maintain respective current global transaction identifiers (GTIDs). The primary database system may maintain a current "primary" GTID and the secondary database system may maintain a current "secondary" GTID. Both systems may maintain their respective current GTIDs in volatile memory for efficient access. Transactions committed by the primary database system to the primary database are each assigned a GTID. Each such GTID may be composed of a sequence number (e.g., a transaction ID) that orders all of the transactions in the order the transactions were committed to the primary database thereby forming a sequence of transactions committed to the primary database. The current primary GTID reflects the most recent transaction, of the sequence of transactions, that has been committed to the primary database. The current secondary GTID reflects the most recent transaction, of the sequence of transactions, that has been replicated from the primary database to the secondary database system and applied to the secondary database. For example, the current primary GTID may be the GTID assigned to the most recent transaction, of the sequence of transactions, committed to the primary database and the current secondary GTID may be GTID assigned to the most recent transaction, of the sequence of transactions, replicated from the from the primary database to the secondary database system and applied to the secondary database. Normally, at any given time, the current secondary GTID is one or more sequence numbers behind the current primary GTID depending on the extent of the replication lag from the primary database to the secondary database.

Turning now to the top of process 200, at operation 202, after the read request is obtained 102, the current primary GTID is obtained. Since the current primary GTID may be maintained in volatile memory at the primary database system, the current primary GTID may be obtained without having to access the current primary GTID in non-volatile memory at the primary database system, thereby making operation 202 relatively efficient.

After operation 202, at operation 204, the current secondary GTID is watched (e.g., by periodically reading or polling) until it is equal to or greater than the primary GTID obtained at operation 202. This operation 204 may also efficiently access the current secondary GTID in volatile memory.

At operation 206, if the current secondary GTID is not less than the primary GTID obtained at operation 202, then the read request is executed against the secondary database 206, assuming the linger operation 204 has not timed out. Executing the read request against the secondary database 206 may include causing the secondary database system to execute one or more database commands (e.g., SQL SELECT commands) corresponding to the read request against the secondary database.

In some embodiments, depending on how the primary database system is configured to operate, it is possible for a transaction to be replicated from the primary database system to the secondary database system and applied to the secondary database before the primary database system has completed the transaction against the primary database. For example, a database system that has a pluggable storage engine (e.g., MySQL) may exhibit this behavior. In this case, optional steps 208 and 210 may be performed to provide linearizable operation so that the read request does not complete from the perspective of the client until after any and all pending transactions caused by prior write requests from the client have been committed to the primary database.

Accordingly, after the read request is successfully executed against the secondary database at operation 206, the current secondary GTID is re-obtained at optional operation 208 post-read. This GTID represents an upper bound on the transactions successfully replicated and applied to the secondary database when the read request was executed at operation 206.

After the post-read secondary GTID is obtained at operation 208, then the current GTID at the primary database system is watched until it exceeds the obtained post-read secondary GTID. Once this happens, it is safe to return from the read request to the client because it has been confirmed that the transaction assigned the post-read secondary GTID is no longer pending commit.

Versioned Data Object Approach

FIG. 3 is a flowchart of a versioned data object approach 300 for lingering the read request as in the linger operation 104 of process 100 above, according to some embodiments.

At operation 302, one or more data objects that are the subject of the read request are identified. This identification can be accomplished by parsing or otherwise inspecting the read request to determine the unique identifiers of the data objects in the read request. For example, the read request may contain the primary keys or other unique identifiers of the data objects that are to be read.

At operation 304, for each of the data objects identified at operation 302, the identifier of the current version of each of the data objects as stored in the primary database is obtained 304. For this, the unique identifiers obtained at operation 302 may be used. Preferably, the current version identifier for a data object is a numerical value and version identifiers are assigned to versions of the data object in sequentially increasing order. This allows two version identifiers to be compared to each to determine whether one version happened before or happened after the other version.

The current version identifiers of the data objects in the secondary database may be updated as replication proceeds. At operation 306, the current version identifiers of the data objects in the secondary database are watched until they are at least at their respective current versions as determined in operation 304.

After all of the data objects are current in the secondary database with respect to the primary database, then the read request may be executed 308 against the secondary database.

Dedicated Logical Clock Approach

FIG. 4 is a flowchart of a dedicated logical clock approach 400 for lingering the read request as in the linger operation 104 of process 100 above, according to some embodiments. In this approach, a logical clock is maintained in the primary database as a sequentially increasing numerical value that is incremented sequentially (e.g., by one) for each read request lingered 104. The logical clock may be incremented in the context of a transaction executed against the primary database. This transaction may then be eventually replicated from the primary database to the second database to update the logical clock in the secondary database.

At operation 402, the logical clock in the primary database is incremented. The incremented value that the logical clock is incremented to is also obtained. At operation 404, the logical clock in the secondary database is watched until it is equal to or greater than the incremented value obtained at operation 402. The read request may be executed 406 against the secondary database once the logical clock in the secondary database is caught up to the incremented value.

Distributed Computing Environment

Figure 5:
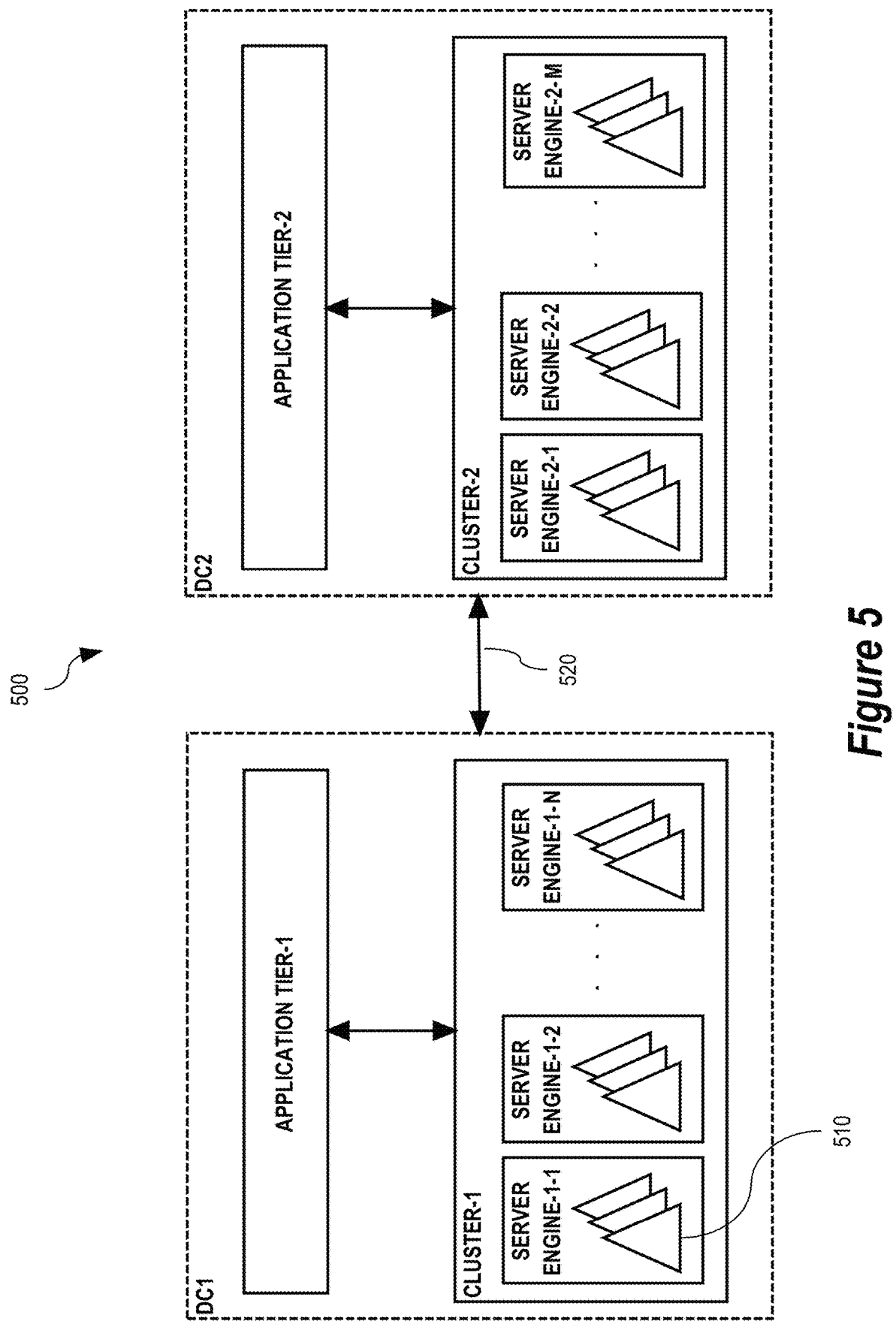
FIG. 5 depicts an example distributed computing environment in which the process of FIG. 1 may be implemented, according to some embodiments.

While some embodiments may be implemented using a single computer system, some embodiments are implemented using multiple computer systems in a distributed computing environment. FIG. 5 shows an example of a distributed computing environment 500, according to some embodiments.

Environment 500 includes two data centers labeled DC1 and DC2. Each data center DC1 and DC2 may include a facility or building for co-locating computer systems and associated components such as data network communications equipment, data storage equipment, and cooling equipment. Data centers DC1 and DC2 may be located at a geographic distance from one another. The geographic distance may be many miles. For example, data center DC1 may be in San Francisco, Calif., U.S.A. and data center DC2 may be in New York, N.Y. U.S.A. It is also possible for data centers DC1 and DC2 to be in different countries.

While in some embodiments the distributed computing environment includes only two data centers, the distributed computing environment may include more than two data centers in other embodiments. In this case, the distributed computing environment may be viewed as being composed of pairs of data centers (data center peers) of which the environment 500 depicted in FIG. 5 is representative of each such pair (peers).

As shown in FIG. 5, each data center DC1 and DC2 may include an application tier, labeled Application Tier-1 and Application Tier-2 in FIG. 5, respectively. Each application tier may be composed of multiple computer systems that execute computer system processes and/or threads that operate as network clients of a respective distributed data storage system cluster. As shown in FIG. 5, a distributed data storage system cluster labeled Cluster-1 serves client computer system processes and/or threads in Application Tier-1 and a distributed data storage system cluster labeled Cluster-2 serves client computer system processes and/or threads in Application Tier-2.

Each distributed data storage system cluster is also composed of multiple computer systems that execute respective database server engines. The computer systems of Cluster-1 execute database server engines Server Engine 1-1, Server Engine 1-2, . . . Server Engine 1-N and the computer systems of Cluster-2 execute Server Engine 5-1, Server Engine 5-2, . . . Server Engine 5-M. The distributed data storage system clusters Cluster-1 and Cluster-2 may have the same or a different number of server engines. Details of an example database server engine are described below with respect to FIG. 6.

While in some embodiments different computer systems are used to execute the client computer system processes and/or threads of the application tier and the server engines of the distributed data storage system cluster, the same computer systems may execute one or more of the client computer system processes and/or threads of the application tier and also execute one or more of the server engines in other embodiments.

Various computer systems of the application tier and the distributed data storage system cluster in a data center may be interconnected by one or more data communications networks. Such a data communications network may support various network communications protocols for sending and receiving network messages (e.g., network requests and network responses thereto) between the various computing machines. Non-limiting examples of network communications protocol suitable for implementing an embodiment of the present invention include the Transmission Control Protocol (TCP), the Hyper Text Transfer Protocol (HTTP), the Secure Hyper Text Transfer Protocol (HTTPS), and/or other Internet Protocol (IP)-based network communications protocols.

In some embodiments, data stored in a distributed data storage system cluster is sharded (horizontally partitioned) over the server engines of the distributed data storage system cluster. As used herein, a shard 510 refers to a horizontal partition of a database. Each of the server engines may store multiple of the shards. In a non-limiting exemplary embodiment, a distributed data storage system cluster contains approximately two thousand (2,000) shards distributed across approximately five hundred and twelve (512) server engines.

In some embodiments, in operation, a client computer system process and/or thread that executes in an application tier may connect to and request data from any of the server engines of the distributed data storage system cluster in the data center. The server engine receiving the request from the client process may inspect the request to determine which shard stores the data that the request pertains to. If the server engine receiving the request does not store the target shard, the server engine may redirect the request to one of the other server engines in the cluster that does store the target shard.

In some embodiments, the distributed data storage system cluster may include a memory cache (e.g., memcache) (not shown in FIG. 5) to improve performance of processing read requests from the application tier. The cache may be partitioned and replicated for high-availability. Data in the cache may be invalidated by write requests from the application tier. The invalidation can be strongly consistent (e.g., using a two-phase commit protocol), or eventually consistent if stale reads from the memory cache are tolerated.

The two data centers DC1 and DC2 may be interconnected by one or more data communications networks 520. As in the case with a data communications networks interconnecting computer systems within a data center, the one or more data communications networks 520 interconnecting data centers DC1 and DC2 may support various network communications protocols (e.g., TCP, HTTP, HTTPS, or other IP-based protocol) for sending and receiving network messages (e.g., network requests and network responses thereto) between the data centers DC1 and DC2.

Database Server Engine

FIG. 6 shows an example database server engine 600 of a distributed data storage system cluster, according to some embodiments. The server engine 600 includes a core server 602, a first database server 604 that operates on a first database 606, a second database server 608 that operates on a second database 610, and a third database server 612 that operates on a third database 614.

The core server 602 receives "client" requests from and sends responses thereto to client computer system processes and/or threads in an application tier. The core server 602 may redirect some client requests to other server engines in the distributed data storage system cluster if the client requests do not pertain to data stored in the database shards of the database server engine 600. For client requests that do pertain to data stored in the database shards of the database server engine 600, the core server 602 may send corresponding "database" requests to the first database server 604. In some scenarios where the first database server 604 is unavailable or for load balancing purposes, the core server 602 may send database requests to the second database server 608 or the third database server 612.

In some embodiments, the first database 606, the second database 610, and the third database 614 are each a relational database. For example, the first database server 604, the second database server 608, and the third database server 612 may each be capable of processing database requests that are based on the Structured Query Language (SQL) or the like.

In some embodiments, core server 602 may perform object-to-relational mapping operations when translating client requests from the application tier to database requests sent to the database servers 604, 608, and 612 and when translating responses to the database requests received from the database servers 604, 608, and 612 to responses to the client requests sent back to the client processes in the application tier.

While in some embodiments the databases 606, 610, and 614 are relational databases, the databases 606, 610, and 614 are logically structured per a different database data model in other embodiments. For example, databases 606, 610, and 614 may be logically structured per a hierarchical, network, object, document, graph, key-value, or another logical database data model. Similarly, while in some embodiments the database servers 604, 608, and 612 are capable of processing database requests that are formulated per SQL or like query language, the database servers 604, 608, and 612 are configured to process database requests that are structured per a different query language in other embodiments. In general, virtually any database query language that supports commands for creating, reading, updating, and deleting data in the databases 606, 610, and 614 may be used.

Database servers 604, 608, and 612 may be configured to eventually replicate data between the databases 606, 610, and 614 in a primary-secondary configuration. For example, data stored in first database 606 may be replicated to second database 610 and data stored in second database 610 may be replicated to third database 614. In this example, database 606 is a "primary" database with respect to "secondary" database 510 and database 510 is a "primary" database with respect to "secondary" database 514. Thus, database data changes applied to first database 606 may first be replicated to second database 610 and then from second database 610 to third database 614.

While in some embodiments such as shown in FIG. 6 a database server engine comprises three database servers and three databases, a database server engine comprises just two database servers and two databases in another embodiment. For example, database sever engine 600 may comprises just database servers 604 and 608 and respective databases 606 and 610 arranged in a primary-secondary replication configuration. It also possible for a database server engine to have more than three database servers and more three respective databases.

While in some embodiments such as shown in FIG. 6 a database server engine comprises a core server for translating client requests from client processes in the application tier to database requests sent to the database servers 604, 608, and 612, a database sever engine does not include a core server. In this case, the client processes in the application tier may send database request directly to the database servers 604, 608, and 612.

While in some embodiments two database servers and their respective database are arranged in a primary-secondary replication configuration with respect to all data stored in the databases, the two database servers and the respective databases are arranged in a primary-secondary replication configuration with respect to only some of the database data. Further, the arrangement may be reserved with respect to other database data. For example, database server 604 and database 606 may be the primary and database server 608 and database 610 the secondary with respect to replication of data stored in one database partition, and database server 608 and database 610 may be the secondary and database server 604 and database 606 the primary with respect to data stored in a different database partition.

Eventually Consistent Replication

FIG. 7 shows an eventually consistent replication process 700, according to some embodiments. The process 700 involves a primary database server 702 and a secondary database server 704 of the same database sever engine 706. Primary database server 702 receives (S408) create, read, update, and delete commands from client computer program processes and/or threads in an application tier. Create, update, and delete commands may also be referred to generally as write commands. The create, read, update, and delete commands may be formulated per the Structure Query Language (SQL) or the like. For example, the create, read, update, and delete commands may be SQL INSERT, SELECT, UPDATE, and DELETE commands respectively. The database commands may be received via a data communications network per a network communications protocol or via other suitable inter-process communications mechanism (e.g., named pipes, shared memory, etc.).

As used herein, unless otherwise apparent in context, the term "primary" refers to a database server or a database that is designated as the "primary" of certain data stored in the database (which may be a subset of all data stored in the database) and participates in a primary-secondary replication scheme whereby changes to the database data in the database are propagated to one or more "secondary" database servers and/or one or more secondary databases that also participate in the replication scheme. A database server and a database can be considered a primary of all the data in the database or less than all data in the database. In the less than all case, the database server and the database may be both a primary database server and database with the respect to the data they primary and a secondary database server and database with respect to other data in the database.

The primary database 702 executes (S710) the received database commands against the primary database 712. In addition, the primary database 702 records (logs) (S714) replication events corresponding to the executed database commands in binary log 716. Each replication event recorded in the binary log 716 may be recorded in a statement-based logging format or a row-based logging format. The statement-based logging is used to propagate database commands (e.g., SQL statements) from the primary database server 702 to the secondary database server 704 where they are executed by the secondary database server 704 against the secondary database 718. Row-based logging is used to record changes in individual database data objects (e.g., individual database table rows).

The primary database server 702 may write (log) replication events to the binary log 716 persisted in non-volatile memory in a sequential fashion through a volatile memory buffer. Thus, while the binary log 716 may be stored in non-volatile memory, the replication events 716 stored in the volatile memory buffer may be stored in the binary log 716.

The secondary database server 704 may request (S720) replication events from the primary database server 702 via a data communications network per a network communications protocol or via another inter-process communications mechanism. The primary database server 704 may send (S722) replication events in the binary log 716 to the secondary database server 704 via a data communications network per a network communications protocol or via another inter-process communications mechanism. As an alternative, the secondary database server 704 may read replication events directly from the binary log 716.

The primary database server 702 may be able to provide new replication events to the secondary database server 704 from the volatile memory buffer without having to read the replication events from non-volatile storage. However, if the secondary database server 704 is behind the primary database server 702 with respect to replication events stored in the binary log 716, then the primary database server 702 may need to read replication events from non-volatile storage to bring the secondary database server 704 up-to-date. Thereafter, the primary database server 702 may be able to provide new replication events to the secondary database server from the volatile memory buffer of the binary log 716.

Replication events that the secondary database server 704 obtains may be recorded (logged) (S724) in a relay log 726. Ordinarily, if the secondary database server 704 is not substantially behind the primary database server 702 with respect to replication events stored in the binary log 616, the latest replication events stored in the relay log 726 are only a one, two, few, or a small number of replication events behind the latest replication events stored in the binary log 716.

The secondary database server 704 may read (S728) replication events from the relay log 724 in a first in first out order and apply (S720) them in that order to the secondary database 718. The secondary database server 704 applies each replication event according to whether the replication event is statement-based or row-based. In this way, the local replication process 700 replicates data from primary database 712 to secondary database 718.

Various factors can contribute to replication lag in the local replication process 600 including time spent by the primary database server 602 and the secondary database server 604 performing operations that are generally performed serially with respect to a given replication event including the primary database server 602 writing (S614) the replication event to the binary log 616 and sending (S622) the replication event to the secondary database server 604 and the secondary database server 604 writing (S624) the replication event to the relay log 626, reading (S628) the replication event from the relay log 626, and applying (S630) the replication event to the secondary database 618.

The components of the server engine 706 may be implemented on a computing system comprising one or more processors and storage media (e.g., volatile and/or non-volatile memory). The one or more processors and memory of the computing system may be provided by one or more computer systems. Although components are shown separately in FIG. 7, various components may be implemented on different computer systems or the same computer system. For example, primary server 702, primary database 712, and binary log 716 may be implemented on a first computer system and secondary server 604, secondary database 618, and relay log 716 may be implemented on a second different computer system. Alternatively, all the components may be implemented on one computer system.

Basic Computer System

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
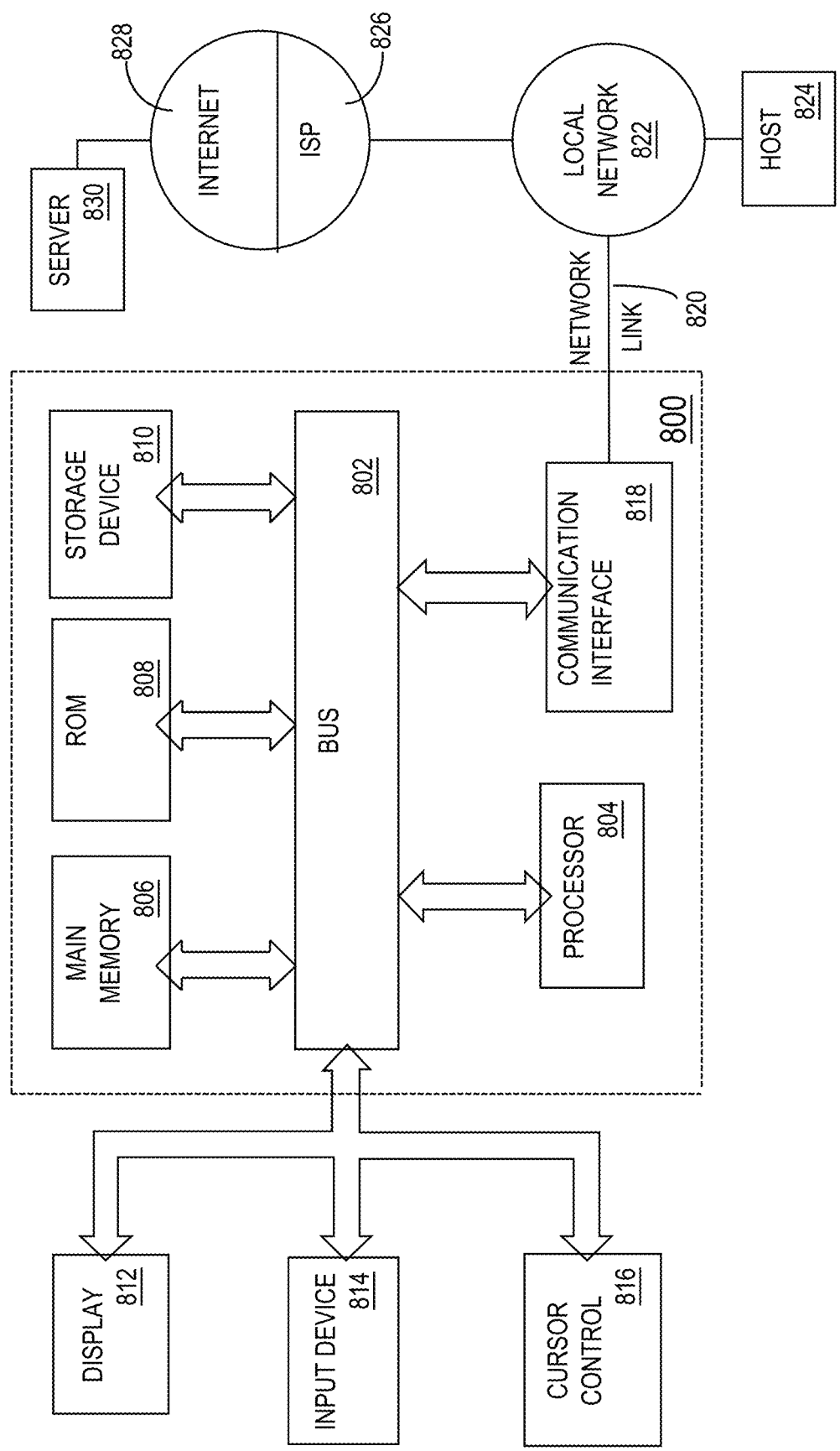
FIG. 8 depicts an example basic computer system with which the techniques may be implemented, according to some embodiments.

For example, FIG. 8 is a block diagram that illustrates an example computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general-purpose microprocessor.

Computer system 800 also includes a main memory 806, such as a random-access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as an OLED, LED or cathode ray tube (CRT), for displaying information to a computer user. In some embodiments, the display 812 includes or is a virtual reality headset, such as a head-mounted display or an augmented reality display. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. The input device may also have more than two degrees of freedom. For example, input device 814 may be a six degree-of-freedom input device that allows movement and rotations in each of three dimensions. The input device 814 may also have multiple input modalities, such as multiple 2-axes controllers, and/or input buttons or keyboard. This allows a user to input along more than two dimensions simultaneously and/or control the input of more than one type of action.

Computer system 800 may implement the techniques described herein using customized hard-wired logic, one or more ASICs or FPGAs, firmware and/or program logic which in combination with the computer system causes or programs computer system 800 to be a special-purpose machine. According to some embodiments, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information. Such a wireless link could be a Bluetooth, Bluetooth Low Energy (BLE), 802.11 WiFi connection, or the like.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world-wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Basic Software System

Figure 9:
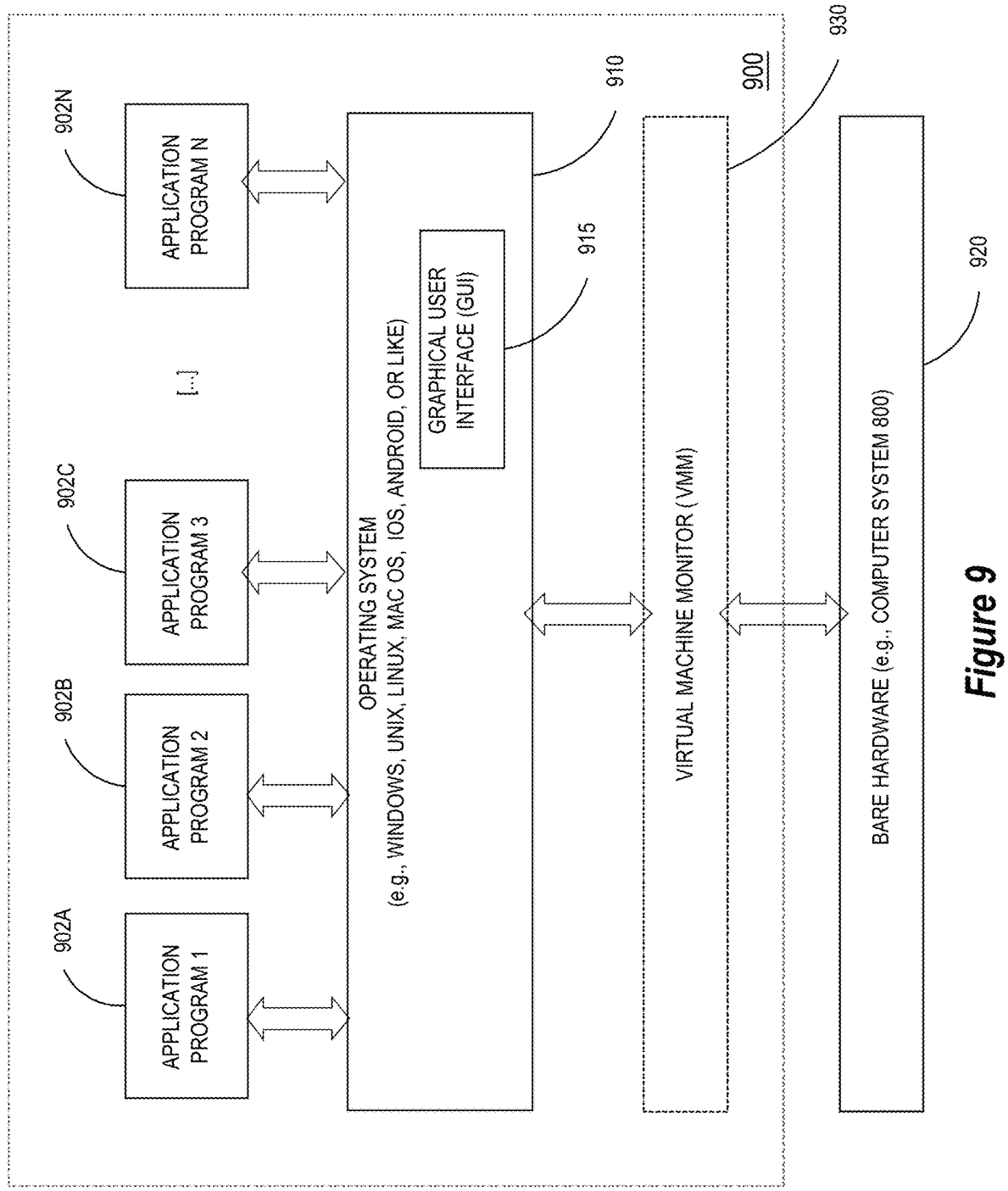
FIG. 9 depicts an example basic software system that may be used to control the operation of the example basic computer system of FIG. 8, according to some embodiments.

FIG. 9 is a block diagram of an example basic software system 900 that may be employed for controlling the operation of computer system 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computer system 800. Software system 900, which may be stored in system memory (RAM) 806 and on fixed storage (e.g., hard disk or flash memory) 810, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 810 into memory 806) for execution by the system 900. The applications or other software intended for use on computer system 800 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of computer system 800. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the computer system 800. In this configuration, the VMM 930 may manage low-level aspects of computer operation in addition to or instead of OS 910.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of computer system 800 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

As used herein, a computer system process or thread comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process or thread is not running. Computer system processes and threads run under the control of an operating system, and may run under the control of other programs being executed on the computer system.

CONCLUSION

The approaches described in the Background section above are approaches that could be pursued, but not necessarily approaches that have been previously conceived or pursued. Therefore, unless otherwise indicated, it should not be assumed that any of the approaches described in the Background section qualify as prior art merely by virtue of their inclusion in the Background section.

In the foregoing detailed description, for purposes of explanation and non-limitation, specific details were set forth, such as particular nodes, functional entities, techniques, protocols, etc. in order to provide an understanding of the described technology. However, other embodiments may be practiced apart from the specific details described, as one skilled in the art will recognize. In other instances, detailed descriptions of well-known methods, devices, techniques, etc. were omitted so as not to obscure the description with unnecessary detail.

Although the terms first, second, etc. are, in some instances, used herein to describe various elements, these elements may not be limited by these terms, depending on context. These terms may be used only to distinguish one element from another, depending on context. For example, a first database server may be termed a second database server, and, similarly, a second database server may be termed a first database server, without departing from the scope of the various described embodiments. The first database server and the second database server may both be database servers, but may not be the same database server.

The terminology used in the detailed description of the various described embodiments herein is for describing embodiments only and is not intended to be limiting. As used in the detailed description of the various described embodiment and the appended claims, the singular forms "a," "an," and "the" are intended to include the plural forms as well, unless the context clearly indicates otherwise. The term "and/or" as used herein refers to and encompasses all possible combinations of one or more of the associated listed items. The terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof. The term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The invention claimed is:

1. A method for providing a linearizable primary-secondary database system to a client even though database data is replicated with eventual consistency, the method performed by a computing system comprising one or more processors and storage media, the method comprising:
    obtaining, by a server engine, a request to read particular data, the server engine comprising a primary database system and a secondary database system, the primary database system comprising a primary database, the secondary database system comprising a secondary database;
    lingering, by the server engine, the read request until either (a) the secondary database is in a consistent replication state with respect to the primary database or (b) an expiration of a timer;
    wherein the particular data is replicated with eventual consistency from the primary database to the secondary database in conjunction with or prior to the secondary database reaching the consistent replication state;
    before the expiration of the timer, detecting, by the server engine, that the secondary database reaches the consistent replication state; and
    causing, by the server engine, the read request to be executed against the secondary database.

2. The method of claim 1, wherein the lingering the read request is based on:
    obtaining a current global transaction identifier from the primary database system that operates on the primary database;
    obtaining a current global transaction identifier from the secondary database system that operates on the secondary database; and
    causing the read request to be executed against the secondary database only if the current global transaction identifier obtained from the secondary database is not less than the current global transaction identifier obtained from the primary database system.

3. The method of claim 2, wherein the lingering the read request is further based on:
    after the read request is successfully executed against the secondary database, reobtaining a current global transaction identifier from the secondary database system;
    reobtaining a current global transaction identifier from the primary database system; and
    returning from the read request to a client only if the current global transaction identifier reobtained from the primary database system exceeds the current global transaction identifier reobtained from the secondary database system.

4. The method of claim 1, wherein the lingering the read request is based on:
    obtaining a unique identifier of a data object that is a subject of the read request;
    using the unique identifier to obtain a current version identifier for the data object from the primary database;

obtaining a current version identifier for the data object from the secondary database; and causing the read request to be executed against the secondary database only if the current version identifier for the data object obtained from the secondary database is not less than the current version identifier for the data object obtained from the primary database.

5. The method of claim 1, wherein the lingering the read request is based on:

incrementing a logical clock in the primary database;

obtaining a value of the logical clock in the primary database after the incrementing;

obtaining a value of the logical clock in the secondary database; and causing the read request to be executed against the secondary database only if the value of the value obtained of the logical clock in the secondary database is not less than the value obtained of the logical clock in the primary database.

6. The method of claim 1, wherein the causing the read request to be executed against the secondary database is based on causing the secondary database system that operates on the secondary database to execute one or more database commands against the secondary database.

7. One or more non-transitory storage media storing one or more programs for providing a linearizable primary-secondary database system to a client even though database data is replicated with eventual consistency the one or more programs comprising instructions which, when executed by a computing system having one or more processors, causes the computing system to perform:

obtaining, by a server engine, a request to read particular data, the server engine comprising a primary database system and a secondary database system, the primary database system comprising a primary database, the secondary database system comprising a secondary database;

lingering, by the server engine, the read request until either (a) the secondary database is in a consistent replication state with respect to the primary database or (b) an expiration of a timer;

wherein the particular data is replicated with eventual consistency from the primary database to the secondary database in conjunction with or prior to the secondary database reaching the consistent replication state;

before the expiration of the timer, detecting, by the server engine, that the secondary database reaches the consistent replication state; and causing, by the server engine, the read request to be executed against the secondary database.

8. The one or more non-transitory storage media of claim 7, wherein the lingering the read request is based on:

obtaining a current global transaction identifier from the primary database system that operates on the primary database;

obtaining a current global transaction identifier from the secondary database system that operates on the secondary database; and causing the read request to be executed against the secondary database only if the current global transaction identifier obtained from the secondary database is not less than the current global transaction identifier obtained from the primary database system.

9. The one or more non-transitory storage media of claim 8, wherein the lingering the read request is further based on:

after the read request is successfully executed against the secondary database, reobtaining a current global transaction identifier from the secondary database system;

reobtaining a current global transaction identifier from the primary database system; and returning from the read request to a client only if the current global transaction identifier reobtained from the primary database system exceeds the current global transaction identifier reobtained from the secondary database system.

10. The one or more non-transitory storage media of claim 7, wherein the lingering the read request is based on:

obtaining a unique identifier of a data object that is a subject of the read request;

using the unique identifier to obtain a current version identifier for the data object from the primary database;

obtaining a current version identifier for the data object from the secondary database; and causing the read request to be executed against the secondary database only if the current version identifier for the data object obtained from the secondary database is not less than the current version identifier for the data object obtained from the primary database.

11. The one or more non-transitory storage media of claim 7, wherein the lingering the read request is based on:

incrementing a logical clock in the primary database;

obtaining a value of the logical clock in the primary database after the incrementing;

obtaining a value of the logical clock in the secondary database; and causing the read request to be executed against the secondary database only if the value of the value obtained of the logical clock in the secondary database is not less than the value obtained of the logical clock in the primary database.

12. The one or more non-transitory storage media of claim 7, wherein the causing the read request to be executed against the secondary database is based on causing the secondary database system that operates on the secondary database to execute one or more database commands against the secondary database.

13. A computing system comprising:

one or more processors;

storage media;

one or more programs stored in the storage media, the one or more programs comprising instructions which, when executed by the computing system, causes the computing system to perform:

obtaining, by a server engine, a request to read particular data, the server engine comprising a primary database system and a secondary database system, the primary database system comprising a primary database, the secondary database system comprising a secondary database;

lingering, by the server engine, the read request until either (a) the secondary database is in a consistent replication state with respect to the primary database or (b) an expiration of a timer;

wherein the particular data is replicated with eventual consistency from the primary database to the secondary database in conjunction with or prior to the secondary database reaching the consistent replication state;

before the expiration of the timer, detecting, by the server engine, that the secondary database reaches the consistent replication state; and causing, by the server engine, the read request to be executed against the secondary database.

14. The computing system of claim 13, wherein the lingering the read request is based on:
- obtaining a current global transaction identifier from the primary database system that operates on the primary database;
- obtaining a current global transaction identifier from the secondary database system that operates on the secondary database; and
- causing the read request to be executed against the secondary database only if the current global transaction identifier obtained from the secondary database is not less than the current global transaction identifier obtained from the primary database system.

15. The computing system of claim 14, wherein the lingering the read request is further based on:
- after the read request is successfully executed against the secondary database, reobtaining a current global transaction identifier from the secondary database system;
- reobtaining a current global transaction identifier from the primary database system; and
- returning from the read request to a client only if the current global transaction identifier reobtained from the primary database system exceeds the current global transaction identifier reobtained from the secondary database system.

16. The computing system of claim 13, wherein the lingering the read request is based on:
- obtaining a unique identifier of a data object that is a subject of the read request;
- using the unique identifier to obtain a current version identifier for the data object from the primary database;
- obtaining a current version identifier for the data object from the secondary database; and
- causing the read request to be executed against the secondary database only if the current version identifier for the data object obtained from the secondary database is not less than the current version identifier for the data object obtained from the primary database.

17. The method of claim 1, further comprising:
- prior to obtaining the read request, obtaining, by the server engine, a request to write the particular data; and
- causing the request to write the particular data to be executed against primary database.

18. The method of claim 17, wherein the write request is sent from the client; and wherein the read request is sent from the client.

19. The one or more non-transitory storage media of claim 7, wherein the one or more programs further comprise instructions which, when executed by the computing system, causes the computing system to perform:
- prior to obtaining the read request, obtaining, by the server engine, a request to write the particular data; and
- causing the request to write the particular data to be executed against primary database.

20. The computing system of claim 13, wherein the one or more programs further comprise instructions which, when executed by the computing system, causes the computing system to perform:
- prior to obtaining the read request, obtaining, by the server engine, a request to write the particular data; and
- causing the request to write the particular data to be executed against primary database.

* * * * *